E. MEIER.
ROLLER BEARING.
APPLICATION FILED MAR. 19, 1917.
1,263,454.
Patented Apr. 23, 1918.
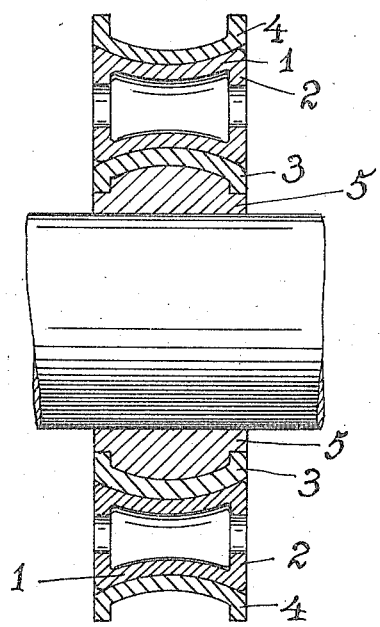

UNITED STATES PATENT OFFICE.

ERLING MEIER, OF CHRISTIANIA, NORWAY.

ROLLER-BEARING.

1,263,454.

Specification of Letters Patent. Patented Apr. 23, 1918.

Application filed March 19, 1917. Serial No. 155,911.

*To all whom it may concern:*

Be it known that I, ERLING MEIER, a subject of the King of Norway, residing at Christiania, Norway, have invented certain new and useful Improvements in Roller-Bearings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to roller bearings and has for its object to provide such bearings with light and resilient roller bodies, which are at the same time sufficiently strong to take up a large pressure.

According to the present invention this object is attained by manufacturing the rollers of seamless steel tubes strengthened by means of inwardly projecting flanges or grooves. The rolling bodies manufactured in this way are very light and strong and provide a silent running bearing.

The invention is particularly adapted for roller bearings with rollers of a hyperbolic shape, which owing to their form can be made very strong of thin material.

On the drawing is shown a bearing of the kind last referred to in axial section.

The rollers 1 are pressed into the form of hyperboloids and are provided at their ends with inwardly projecting flanges 2. The bearing rings 3, 4 may also, as shown on the drawing, be manufactured by pressing steel tubes or rings in such a manner that their bearing surfaces correspond to the surfaces of the rollers 2. The inner bearing surface 3 may be pressed upon an inner core 5 of a hardened material.

I claim:

A roller bearing comprising a plurality of rollers consisting of lengths of steel tubing of hyperbolic shape and having inturned end flanges, concentric inner and outer concavo-convex bearing rings of seamless steel tubing conforming to the surface of the rollers, and an annular core carrying the inner bearing ring.

In testimony that I claim the foregoing as my invention, I have signed my name in presence of two subscribing witnesses.

ERLING MEIER.

Witnesses:
C. NORMAN,
C. FABRICIUS HANSEN.